March 21, 1961 D. RICHMAN 2,976,359

KEYED A.G.C. SYSTEM WITH MEANS FOR PREVENTING SIGNAL LOCKOUT

Original Filed May 9, 1951 2 Sheets-Sheet 1

INVENTOR.
DONALD RICHMAN

BY Everett A. Gartrell

ASSOCIATE ATTORNEY

KEYED A.G.C. SYSTEM WITH MEANS FOR PREVENTING SIGNAL LOCKOUT

Original Filed May 9, 1951 2 Sheets-Sheet 2

INVENTOR.
DONALD RICHMAN
BY
Everett A. Gartell
ASSOCIATE ATTORNEY

United States Patent Office 2,976,359

Patented Mar. 21, 1961

2,976,359

KEYED A.G.C. SYSTEM WITH MEANS FOR PREVENTING SIGNAL LOCKOUT

Donald Richman, Fresh Meadows, N.Y., assignor to Hazeltine Research, Inc., Chicago, Ill., a corporation of Illinois Continuation of application Ser. No. 225,388, May 9, 1951. This application June 23, 1955, Ser. No. 517,614

10 Claims. (Cl. 178—7.3)

GENERAL

Figures 1, 4:
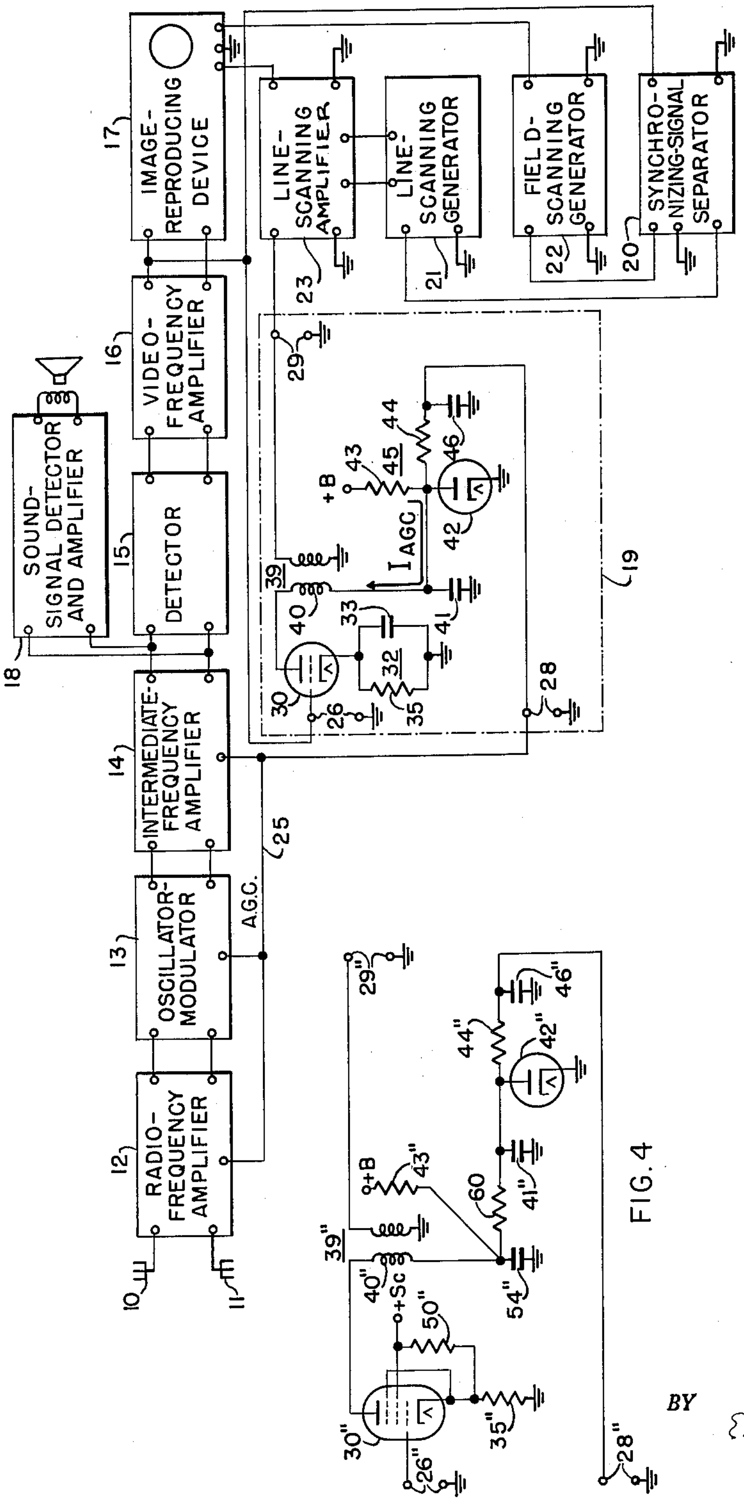

This application is a continuation of my application Serial No. 225,388, filed May 9, 1951, entitled "Control Apparatus for Television Receivers."

The present invention relates to apparatus for automatically controlling an operating characteristic such as the gain or amplification of a television receiver.

In accordance with present television practice, there is developed and transmitted a signal which comprises a carrier-wave signal modulated during recurrent intervals or trace periods by picture components representative of the light and shade values of an image being transmitted. During retrace intervals between the trace periods, the carrier-wave signal is modulated by synchronizing-signal components or pulses which correspond to the initiation of successive lines and fields in the scanning of the image being televised. At the receiver, a beam is so deflected as to scan and illuminate a target in a series of fields of parallel lines. The picture components of the received signal are utilized to control the intensity of the scanning beam. The line-scanning and the field-scanning components are separated from the picture components and from each other and are utilized to synchronize the operation of the receiver line-scanning and field-scanning generators with the similar scanning apparatus utilized at the transmitter in developing the transmitted signal. The transmitted image is thereby reconstructed on the target of the receiver.

It is desirable that a television receiver include suitable apparatus for developing a control effect automatically to control the gain or amplification thereof. This gain-control effect, usually referred to as the A.G.C. effect, which is determined by the intensity of the received carrier-wave signal and is substantially independent of the picture modulation components, is employed to maintain the signal input to the various stages of the receiver within a relatively narrow range for a wide range of received signal intensities.

The so-called synchronous or keyed automatic-gain-control apparatus, that is gain-control apparatus which is keyed into operation only during the occurrence of the line-synchronizing pulses, is coming into wider use in television receivers since such apparatus is effective to reject undesirable interference such as noise occurring during the intervals between synchronizing pulses and, hence, is able to develop an accurate gain-control effect. Under certain operating conditions, however, receivers employing keyed automatic-gain-control apparatus may experience more difficulty in pulling into synchronism with the received synchronizing pulses than does a receiver employing a peak-detector type of automatic gain control. For example, when a receiver having a keyed automatic-gain-control apparatus is switched on, or when a receiver initially tuned to receive signals from a transmitter operating on one channel is then retuned to a second channel, the keyed signals and the synchronizing pulses applied to the automatic-gain-control apparatus may not initially and at regular intervals thereafter occur in proper time coincidence. As a result, the developed automatic-gain-control effect may be considerably smaller than its normal value and the composite television signal translated by the receiver may have such a high amplitude that the receiver is overloaded thereby. Consequently, the video-frequency amplifier system of the receiver is unable faithfully to translate the composite television signal and amplitude limiting of the synchronizing signals undesirably occurs or, in some instances, amplitude limiting may sometimes occur in the region of the picture-signal components. It therefore follows that the synchronizing signals applied to the scanning generators of the receiver may have insufficient amplitude or may be absent and, hence, unable properly to control the synchronization of those generators. In particular, the amplitude of the synchronizing signals may be such that the receiver will not pull into synchronism and the receiver may undesirably continue to operate in a stable but overloaded condition. When the receiver is operating in one of the undesired modes just mentioned, a faulty image having no pictorial value whatever results and, in many instances, the receiver may develop an objectionable buzzing noise.

It is an object of the invention, therefore, to provide a new and improved apparatus for automatically controlling an operating characteristic of a television receiver which avoids one or more of the above-mentioned disadvantages of prior such apparatus.

It is another object of the invention to provide a new and improved automatic-gain-control apparatus for a television receiver which affords improved performance with respect to the receiver pulling into synchronism with the applied synchronizing signal.

It is a further object of the invention to provide a new and improved automatic control apparatus for a television receiver which is effective to prevent the receiver from operating stably in an undesired mode.

It is an additional object of the invention to provide a new and improved automatic-gain-control apparatus for a television receiver which derives an automatic-gain-control effect of sufficient magnitude to prevent the receiver from overloading.

For a better understanding of the present invention, together with other and further objects thereof, reference is had to the following description taken in connection with the accompanying drawings, and its scope will be pointed out in the appended claims.

In the accompanying drawings, Fig. 1 is a circuit diagram, partly schematic, of a complete television receiver including a control apparatus in accordance with a particular form of the present invention; Figs. 2A–2E, inclusive, are graphs utilized in explaining the operation of the control apparatus of Fig. 1; and Figs. 3 and 4 are other forms of the control apparatus in accordance with the present invention.

*General description of Fig. 1 receiver*

Referring now more particularly to Fig. 1 of the drawings, the television receiver there represented comprises a receiver of the superheterodyne type including an antenna system 10, 11 coupled to a radio-frequency amplifier 12 of one or more stages. There is coupled to the latter unit, in cascade, in the order named, an oscillator-modulator 13, an intermediate-frequency amplifier 14, of one or more stages, a detector 15, a direct-current video-frequency amplifier 16, of one or more stages, and a cathode-ray image-reproducing device 17 of conventional construction provided with the usual line-frequency and field-frequency scanning coils (not shown) for deflecting a cathode-ray beam in two directions normal to each other. Connected to the output terminals of the intermediate-frequency amplifier 14 is a conventional sound-signal detector and amplifier 18 which comprises the usual frequency detector amplifiers and sound-reproducing device.

An output circuit of the video-frequency amplifier 16 is coupled to a line-scanning generator 21 and a field-scanning generator 22 through a synchronizing-signal separator 20. The output circuit of the generator 21 is coupled in a conventional manner to the line-scanning coil of the image-reproducing device 17 through a line-scanning amplifier 23 while the field-scanning generator 22, which may include suitable amplifiers, is connected to the field-scanning coil of the image-reproducing device. An output circuit of the line-scanning amplifier 23 is connected to input terminals 29, 29 of an automatic control apparatus 19. The output circuit of the video-frequency amplifier 16 is also conductively connected to input terminals 26, 26 of the automatic control apparatus 19. Output terminals 28, 28 of the control apparatus 19 are connected to the input circuits of one or more of the stages of units 12, 13 and 14 by a control circuit conductor 25 to supply an automatic-gain-control or A.G.C. effect to those stages. The units 10–23, inclusive, with the exception of the apparatus 19, which is constructed in accordance with the present invention and will be described in detail hereinafter, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 10, 11 are selected and amplified in the radio-frequency amplifier 12 and are supplied to the oscillator-modulator 13 wherein they are converted into intermediate-frequency signals. The latter in turn, are selectively amplified in the intermediate-frequency amplifier 14 and are delivered to the detector 15. The modulation components of the signal are derived by the detector and are applied to the video-frequency amplifier 16 wherein those components including the original unidirectional components are amplified and from which they are supplied to the input circuit of the image-reproducing device 17.

A control voltage, which is derived by the automatic-gain-control supply in unit 19 in a manner to be explained in detail subsequently, is applied by the control circuit conductor 25 as an automatic-gain-control bias to the gain-control circuits of units 12, 13 and 14 to maintain the signal input to the detector 15 within a relatively narrow range for a wide range of received signal intensities. The video-frequency output signal, including the line-synchronizing pulses and the field-synchronizing pulses, is applied to the synchronizing-signal separator 20 wherein the two types of synchronizing pulses are separated from the video components and from each other and the separated pulses are then supplied to individual ones of the generators 21 and 22 to synchronize the operation thereof. An electron beam is produced by the cathode-ray image-reproducing device 17 and the intensity of this beam is controlled in accordance with the video-frequency and control voltages impressed on the brilliancy-control electrode thereof. Saw-tooth current waves are generated in the line-frequency and the field-frequency generators 21 and 22, respectively. The output signal of the generator 21 is supplied to the line-scanning coil of device 17 through the amplifier 23 while the output signal of generator 22 is supplied to the field-scanning coil of the device 17 to produce the usual scanning fields, thereby to deflect the cathode-ray beam of device 17 in two directions normal to each other to trace a rectilinear scanning pattern on the screen of the tube and thereby reconstruct the translated picture.

The audio-frequency modulation components of the received signal are derived in a conventional manner by the sound-signal detector and amplifier 18 and are supplied to the loudspeaker thereof and are converted into sound.

*Description of control apparatus of Fig. 1*

Referring now more particularly to Fig. 1 of the drawings, the automatic control apparatus 19 for the television receiver includes an electron-discharge means, such as a triode 30, arranged normally to be maintained in a nonconductive condition in a manner which will be made clear hereinafter. The apparatus 19 includes a circuit which is conductively connected to the input terminals 26, 26 for applying to a pair of electrodes of the tube 30, specifically to the control electrode-cathode input electrodes, the composite modulation output signal of the video-frequency amplifier 16, which signal includes the usual picture components, synchronizing-signal pulses and the original unidirectional components. The synchronizing pulses have such polarity as to tend to render the tube 30 conductive.

The apparatus 19 further includes a circuit for applying to a second pair of electrodes, specifically to the anode-cathode electrodes, periodic control pulses having an amplitude substantially unaffected by amplitude variations of the synchronizing pulses, a frequency component not substantially different from a frequency component of the synchronizing pulses, and with such polarity as to render the tube 30 conductive and develop space-current pulses therein only during coincidence of the aforesaid synchronizing pulses and the control pulses, which space-current pulses sometimes occur during pull-in operation of the receiver in groups having a recurrence rate substantially less than that of the synchronizing pulses due to intermittent coincidence of the synchronizing pulses and the control pulses as will be explained subsequently. The periodic control pulses preferably have a frequency which, under normal operation of the receiver, is equal to that of the synchronizing pulses, although the frequency of the control pulses may be substantially different therefrom such as when the control pulses are a harmonic or a subharmonic of the synchronizing pulses. Thus, when the frequency of the control pulses is twice that of the synchronizing pulses, alternate ones of the control pulses comprise components thereof having a frequency not substantially different from a frequency component of the synchronizing pulses, and in the case just mentioned, from the frequency of the synchronizing pulses. The circuit for applying the above-mentioned periodic pulses comprises an input circuit including the input terminals 29, 29 which are coupled to an output circuit of the line-scanning amplifier 23 and are also coupled to the tube 30 through a transformer 39. One terminal of a secondary winding 40 of the transformer 39 is connected to the anode of the tube 30 and the other terminal thereof is connected to ground through a condenser 41. The ungrounded one of the terminals 29, 29 is preferably coupled to a suitable point in the line-scanning amplifier 23, such as the anode of the amplifier tube, where there is developed in a conventional manner during each line retrace interval a relatively high-amplitude short duration impulse of positive polarity due to the collapsing magnetic field in the circuits associated with the line-scanning coil of the image-reproducing device 17. Well-known characteristics, such as the Q of the tuned circuit and its amplifier 23, are such that the positive output pulses applied by the latter to the terminals 29, 29 have an amplitude which is substantially unaffected by amplitude variations or temporary loss of synchronizing-signal pulses applied to the terminals 26, 26 of unit 19 from the video-frequency amplifier 16.

The apparatus 19 additionally includes a time-constant network 32 connected as a cathode load for the tube 30 and preferably having a relatively high impedance and a time constant at least several times the period of the synchronizing-signal pulses. This network comprises a resistor 35 and a condenser 33 which are connected in parallel between the cathode of the tube 30 and ground. Unit 19 also includes an impedance network 45 responsive to the space-current pulses of the tube 30 and including a unidirectional conductive portion which may, for example, comprise a diode 42, and a second portion including a source of potential indicated as +B, a resistor 43 and an energy-storage device comprising the condenser 41 connected in series relation across the aforesaid source. The condenser is effectively coupled in parallel with the diode 42 and has a capacitance which is so proportioned as to afford a low impedance at the frequency of the control pulses supplied by terminals 29, 29 and a substantially greater impedance at the recurrence rate of the above-mentioned groups of space-current pulses for developing across the condenser 41 from those groups of pulses a control effect related to the peak amplitude of the synchronizing pulses and substantially equal to a control effect developed thereacross from space-current pulses having a frequency component equal to the frequency component of the synchronizing pulses. As will be explained in detail subsequently, the recurrence rate of the groups of pulses just referred to lies within a range of about 30–500 cycles per second and the condenser 41 is selected to have a high impedance in that frequency range relative to the resistance of the anode-cathode path of tube 30 and a low impedance in relation to the aforesaid resistance to control pulses having a frequency of 15,750 pulses per second. The resistor 43 and the condenser 41 comprise a time-constant network having a time constant at least several times the period of the synchronizing pulses. The impedance network 45 preferably includes a resistor-condenser filter network 44, 46 which is coupled across the condenser 41 and effectively comprises an audio-frequency filter network for reducing the extent of ripples occurring in the control effect at the recurrence rate of the aforesaid groups of space-current pulses.

The junction of the resistor 44 and the condenser 46 is connected to the ungrounded one of the terminals 28, 28 which is, in turn, as previously stated, connected by the control circuit conductor 25 to the input circuits of units 12–14, inclusive. The terminals 28, 28 and the described circuit connections are employed to apply the control effect developed across the network 41, 43 to the receiver to control an operating or gain-control characteristic thereof.

*Operation of control apparatus of Fig. 1*

In considering the operation of the automatic control apparatus 19, it will be assumed initially that synchronizing-signal pulses having a predetermined minimum amplitude are applied to the terminals 26, 26 so that proper operating biases are established across both the network 32 and the condenser 41 by several cycles of operation of the apparatus. These operating biases are such that the tube 30 is normally nonconductive but is rendered conductive only during coincidence of the synchronizing pulses applied to the terminals 26, 26 and the control pulses applied to the terminals 29, 29. As previously mentioned, the composite signal including the usual picture components, line-synchronizing and field-synchronizing pulses and the unidirectional component is supplied by the output circuit of the direct-current video-frequency amplifier 16 to the input terminals 26, 26 coupled to the control electrode-cathode input circuit of the tube 30. There is also applied to the anode-cathode circuit of that tube by way of the terminals 29, 29 and the transformer 39 a control signal comprising periodic positive polarity gating pulses supplied by the line-scanning amplifier 23. These periodic pulses, which constitute the anode-energizing potential for the tube 30 under normal operating conditions, are supplied to the anode thereof in synchronous relation with, and preferably, as previously mentioned, coincident with, the application of each of the line-synchronizing pulses periodically and momentarily to render the tube 30 conductive, thereby to develop across the network 32 a control effect or unidirectional potential of positive polarity related to the peak amplitude for the line-synchronizing components and substantially independent of undesired random noise pulses included in the composite signal. The manner in which the network 32 is effective to cause the developed control effect to be substantially independent of the undesired random noise pulses is explained in detail in applicant's copending application Serial No. 175,191, filed July 21, 1950, and entitled "Control Apparatus for Television Receivers," which discloses a control apparatus similar to that of the present invention. Specifically, the potential developed across the network 32 is proportional to the amplitude of the synchronizing-signal pulses and is positive at the cathode of the tube 30. A control effect or potential having a value related to the aforesaid cathode potential but having a negative polarity is developed across the condenser 41 of the time-constant network 41, 43 since the last-mentioned network and the network 32 are both in the same direct-current anode-cathode loop or circuit of the tube 30. The potential developed across the condenser 41 for translation by the filter network 44, 46 to the output terminals 28, 28 is related to the average direct current drawn through the anode excitation source comprising the transformer 39. Thus, in Fig. 1 the average or direct-current component of space current through the tube 30 may be designated $I_{AGC}$, the potential developed across the condenser 41 as $E_{41}$ or $E_{AGC}$, the resistance of the resistor 43 as $R_{43}$ and the potential of the source +B as B. It will be clear, therefore, that $$E_{41}=B-I_{AGC}\times R_{43}=E_{AGC}$$

This relationship holds true for low-frequency pulsations as well as for direct current. The magnitude of this potential $E_{AGC}$ is related to the maximum amplitude of the signal applied to the input circuit of the tube 30 since the magnitude of the signal just mentioned controls the magnitude of the space current of that tube which, in turn, controls the magnitude of the negative polarity potential $E_{AGC}$. Thus, the potential $E_{AGC}$ constitutes an automatic-gain-control potential related to the peak value of the composite signal applied to the terminals 26, 26. Accordingly, the potential just mentioned is proportional to the effective amplitude of the carrier component of the television signal intercepted by the antenna system 10, 11 of the receiver and is effective for its designated purpose.

Should the effective amplitude of the carrier component of the television signal applied to the antenna system 10, 11 decrease so that the amplitude of the synchronizing-signal pulses applied to the terminals 26, 26 of apparatus 19 falls below a predetermined level, the space current of the tube 30 decreases to such an extent that the potential appearing at the junction of the condenser 41 and the resistor 43 tends to have a positive value. Accordingly, the diode 42 becomes conductive and current supplied by the source +B flows through the resistor 43 to ground. Since the conductive impedance of the tube 42 is very low, the junction of the anode of the tube 42 and the condenser 41 assumes a potential which is substantially at ground potential. Accordingly, a potential is supplied through filter network 44, 46 and the terminals 28, 28 to the units 12–14, inclusive, tending to increase the amplitude of the composite signal applied to the terminals 26, 26. The parameters of the series circuit comprising the source +B, the resistor 43 and the diode 42 are such that the impedance network 45 develops a so-called delayed automatic-gain-control potential for application to units 12–14, inclusive. The nature of this delayed gain-control action is so well understood that further explanation is deemed unnecessary herein.

Figure 2:
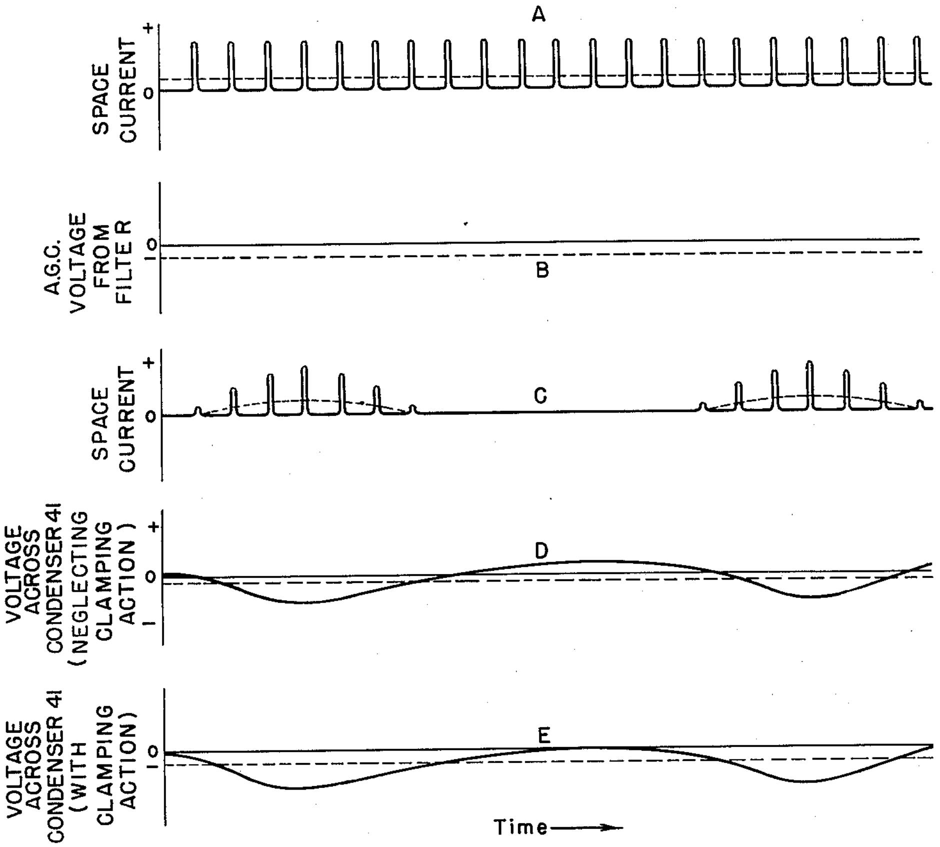
Figure 3:
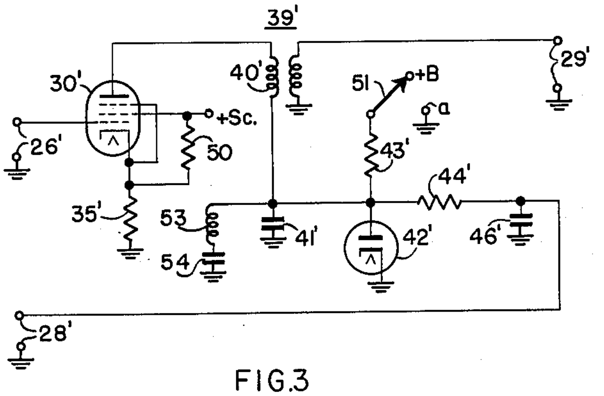

Referring now to Figs. 2A–2E, inclusive, of the drawings, Fig. 2A represents a series of space-current pulses which flow through the tube 30 during coincidence of each of the synchronizing pulses and control pulses applied to the control electrode-cathode circuit and the anode-cathode circuit, respectively, of the tube under normal operating conditions when the delayed bias developed across the condenser 41 has been overcome by synchronizing pulses of an amplitude exceeding the predetermined amplitude previously mentioned. The average value of the space current is represented by the broken line. Under the condition just mentioned, the automatic-gain-control voltage developed across the filter network 44, 46 for application to the output terminals 28, 28 may be represented by the broken line of Fig. 2B. This potential has a negative polarity and an amplitude which is proportional to the average amplitude of the space current represented by the broken line in Fig. 2A.

Under some operating conditions, such as when the receiver is returned to receive signals from a transmitter operating on a second channel, the synchronizing pulses applied to the terminals 26, 26 and the control pulses applied to the terminals 29, 29 may not regularly occur in proper time coincidence. Under this assumed condition, the synchronizing pulses and the control pulses may only recurrently occur in synchronism due to slight differences in the phase or frequency of the control pulses applied to the terminals 29, 29 and the synchronizing pulses applied to the terminals 26, 26. Under this assumed condition, the space-current pulses in the tube 30 may occur in recurrent groups as represented in Fig. 2C, the amplitudes of these pulses varying in the general manner represented due to the slope and duration of the control pulses. The average value of each recurrent group of pulses may be represented by the broken line shown in Fig. 2C. It has been determined that these recurrent groups of pulses have a recurrence rate within an audio-frequency range of about 30–500 cycles per second, this recurrence rate being in the nature of a beat-note frequency between the coincident synchronizing pulses and control pulses. The individual groups of space-current pulses of Fig. 2C may be considered as being effective to develop across the condenser 41 a gain-control potential which may be represented by the broken line.

Considering for the moment that the condenser 41 has a value of a condenser usually selected for a condenser in that environment, it will be observed that the average value of this unidirectional gain-control potential, which may be represented by the broken line in Fig. 2D, is considerably less than that represented by the broken line of Fig. 2B for the condition when the developed space-current pulses occur with consistent regularity as represented in Fig. 2A. The application of such a gain-control potential, as represented by the broken line of Fig. 2D, would normally be insufficient properly to control the gain of the receiver and would permit the signal translated through the main signal-translating channel including the video-frequency amplifier 16 to reach such a high level that the amplifier 16 would be overloaded. Under this assumed condition, amplitude limiting by the video-frequency amplifier 16 of the synchronizing pulses would occur or, alternatively in some instances, amplitude limiting might occur in the region of the picture-signal components. Consequently, for the assumed condition, the synchronizing pulses applied to the synchronizing-signal separator 20 and, in turn, to the line-scanning generator 21 and the field-scanning generator 22 would have insufficient amplitude properly to control the synchronization of those generators were it not for the action of the condenser 41 and the diode 42.

As a result of the groups of space-current pulses occurring at a recurrence rate of between about 30 and 500 cycles per second, there is developed across the condenser 41 (assuming now it is selected in accordance with the teachings of the present invention and neglecting for the moment the action of the diode 42) an alternating potential or beat-frequency signal having a wave form similar to that represented by the full-line curve of Fig. 2D. This potential is in the nature of a sine wave, the negative going portions of which occur at the times the groups of space-current pulses of Fig. 2C are developed. The positive swing of this alternating potential of Fig. 2D occurs during the interval between the groups of space-current pulses, and the magnitude of this positive swing is determined largely by the length of that interval when the junction of the condenser 41 and the resistor 43 becomes more positive due to the flow of positive charging current into the condenser 41 through resistor 43 from the source +B.

When the potential at the junction of the condenser 41 and the resistor 43 swings positive, the diode 42 becomes conductive and serves to clamp the most positive portion of the alternating potential developed across the condenser 41 at substantially the ground level. Consequently, the potential varying at the aforesaid recurrence rate as developed across the condenser 41 actually has the wave form represented by the full-line curve of Fig. 2E. The average value of this potential as it appears at the output terminal of the filter network 44, 46 is represented by the broken line of Fig. 2E and has a magnitude substantially equal to the control potential represented by the broken line of Fig. 2B. Thus, it will be seen that the conjoint action of the diode 42 and the impedance network 45 of unit 19 is effective to develop for application through the terminals 28, 28 and, in turn, through the control circuit conductor 25 to the input circuits of units 12–14, inclusive, a gain-control potential of sufficient magnitude to prevent the video-frequency amplifier 16 from overloading. The development of this more desirable gain-control potential is such that synchronizing-signal pulses of satisfactory amplitude are recurrently applied to the scanning generators 21 and 22 properly to control the operation thereof. Also, the various circuits of the receiver will very quickly thereafter pull into synchronism, thus assurring normal automatic-gain-control action in the receiver.

The following circuit constants are given as illustrative of circuit elements which may be utilized in the circuit of Fig. 1:

| | |
|---|---|
| Resistor **35** ________________ | 750 kilohms. |
| Resistor **43** ________________ | 1 megohm. |
| Resistor **44** ________________ | ½ megohm. |
| Condensers **33** and **46** _______ | 0.47 microfarad. |
| Condenser **41** ______________ | 4,000 micromicrofarads. |
| Tube **30** ___________________ | Type 12AT7 (½ thereof) or Type 6AB4. |
| +B ______________________ | 200 volts. |
| Periodic potential applied to terminals **26, 26** __________ | About 50 volts peak-to-peak. |
| Periodic potential applied to anode of tube **30** __________ | About 350 volts. |
| Duration of potential applied to anode of tube **30** __________ | 7½ to 11 microseconds. |

*Description and operation of Fig. 3 apparatus*

Referring now to Fig. 3 of the drawings, there is represented a circuit diagram of a modified form of control apparatus which is generally similar to that represented in Fig. 1. Elements of the control apparatus of Fig. 3 corresponding to like elements of the control apparatus 19 of Fig. 1 are designated by the same reference numerals primed. The control apparatus of Fig. 3 differs essentially from that of Fig. 1 in that it employs a pentode 30' instead of a triode and also utilizes a series-resonant circuit comprising an inductor 53 and a condenser 54 which are adapted to be coupled in parallel with the condenser 41'. The suppressor electrode of the tube 30' is connected to the cathode and the screen electrode is connected to a source of potential indicated as +*Sc* and is also connected to ground through a potential divider comprising a resistor 50 and a resistor 35'. The junction of the resistors just mentioned is connected to the cathode for applying a predetermined bias to the control-electrode-cathode circuit of the tube 30'. The resistor 35' reduces current flow through the tube 30' and increases the delay bias afforded by the circuit including the condenser 41' and the diode 42'. In the event that a larger delay bias is desired, the source of potential +B is adapted to be connected to the resistor 43' through a switch 51. For some applications, the voltage derived across the resistor 35' may be adequate to afford the necessary delay bias so that the switch 51 may be connected to the grounded switch point *a*. The series-resonant circuit 53, 54 is so proportioned as to provide a low impedance at the fundamental frequency of control pulses applied to the transformer 39' from the terminals 29', 29'. The condenser 41' is seletced to have a high impedance at a frequency in the range of about 30–500 cycles per second with relation to the resistance of the anode-cathode path of tube 30'.

When the switch 51 is connected to the source of potential +B as indicated, the control apparatus of Fig. 3 is effective to develop at its output terminals 28', 28' a control effect similar to that developed by the apparatus of Fig. 1. The operation of the Fig. 3 apparatus is essentially the same as that of Fig. 1 and need not be repeated. When the switch 51 is connected to the switch point *a*, synchronizing signals of lower amplitude are effective to develop across the condenser 41' a satisfactory negative gain-control potential.

*Description of Fig. 4 apparatus*

Referring now to Fig. 4 of the drawings, there is represented a circuit diagram with another form of control apparatus which is very similar to that represented in Fig. 3. Accordingly, corresponding elements are designated by the same reference numerals double primed. The control apparatus of Fig. 4 differs from that of Fig. 3 in that it does not employ a series-resonant circuit and also in that the source of potential +B is connected through the resistor 43'' to the junction of the condenser 54'' and the transformer secondary winding 40''. Additionally, the control apparatus of Fig. 4 employs a resistor 60 connected between the junctions of the condensers 54'' and 41''. The condenser 54'' has a low impedance to control pulses supplied thereto by the transformer secondary winding 40'' and the condenser 41'' has a relatively high impedance at the recurrence rate of the groups of space-current pulses represented in Fig. 2C of the drawings. The resistor 60 and the condenser 41'' constitute a filter for the 15,750 cycle pulses applied to the condenser 54''. The operation of the Fig. 4 control apparatus is similar to that explained in connection with Fig. 1 and need not be repeated.

While applicant does not intend to limit the invention to any specific circuit constants, the following circuit constants are given as illustrative of one embodiment of the invention in accordance with the arrangement of Fig. 4:

| | |
|---|---|
| Resistor **35''** | 10 kilohms. |
| Resistor **43''** | 1 megohm. |
| Resistor **44''** | ½ megohm. |
| Resistor **50''** | 3.3 kilohms. |
| Resistor **60** | 27 kilohms. |
| Condenser **41''** | 4,000 micromicrofarads. |
| Condenser **46''** | 0.47 microfarad. |
| Condenser **54''** | 2,000 micromicrofarads. |
| Tube **30''** | Type 6AU6. |
| +B | 200 volts. |
| +Sc | 125 volts. |
| Periodic potential applied to terminals **26''**, **26''** | About 50 volts peak-to-peak. |
| Periodic potential applied to anode of tube **30''** | About 350 volts. |
| Duration of potential applied to anode of tube **30''** | 7½ to 11 microseconds. |

From the foregoing description of the various embodiments of applicant's invention, it will be apparent that it comprises a new and improved automatic-gain-control apparatus for a television receiver which affords the improved performance which permits the receiver to pull quickly into synchronism with the applied synchronizing signal. It will also be clear that an automatic-gain-control apparatus in accordance with the present invention is effective to derive an automatic-gain-control effect of sufficient magnitude to prevent the receiver from overloading.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A keyed automatic-gain-control apparatus for a television receiver including a synchronizing-pulse supply circuit and a keying-pulse supply circuit, comprising: means including a mixing circuit coupled to both of said supply circuits for mixing synchronizing pulses and keying pulses for developing a first automatic-gain-control effect from their coincidence at synchronizing pulse frequency when the synchronizing and keying pulses are in synchronism and a second automatic-gain-control effect from their coincidence at their beat note frequency when they are out of synchronism; and means responsive to both said control effects for applying automatic-gain-control to said receiver.

2. A keyed automatic-gain-control apparatus for a television receiver including a synchronizing-pulse supply circuit and a keying-pulse supply circuit, comprising: means including a mixing circuit coupled to both of said supply circuits for mixing synchronizing pulses and keying pulses and including load impedance means proportioned for developing a first automatic-gain-control effect from their coincidence at synchronizing pulse frequency when the synchronizing and keying pulses are in synchronism and a second automatic-gain-control effect from their coincidence at their beat note frequency when they are out of synchronism; and means responsive to both said control effects for applying automatic-gain-control to said receiver.

3. A keyed automatic-gain-control apparatus for a television receiver including a synchronizing-pulse supply circuit and a keying-pulse supply circuit, comprising: means including a mixing circuit coupled to both of said supply circuits for mixing synchronizing pulses and keying pulses and including load impedance means proportioned for developing a periodic signal of a first given characteristic when the synchronizing and keying pulses are in synchronism and a periodic signal of a second given characteristic when they are out of synchronism; and means responsive to both said periodic signals for applying automatic-gain-control to said receiver.

4. A keyed automatic-gain-control apparatus for a television receiver including a synchronizing-pulse supply circuit and a keying-pulse supply circuit, comprising: means including a mixing circuit coupled to both of said supply circuits for mixing synchronizing pulses and keying pulses and including load impedance means proportioned for developing a continuous pulse signal when the synchronizing and keying pulses are in synchronism and a recurrent pulse-group signal having a frequency which is a beat between the frequencies of the synchronizing and keying pulses when they are out of synchronism; and means responsive to both said pulse signals for applying automatic-gain-control to said receiver.

5. A keyed automatic-gain-control apparatus for a television receiver including a synchronizing-pulse supply circuit and a keying-pulse supply circuit, comprising: means including a mixing circuit coupled to both of said supply circuits for mixing synchronizing pulses and keying pulses and including load impedance means proportioned for developing a recurrent pulse-group signal having a frequency which is a beat between the frequencies of the synchronizing and keying pulses when they are out of synchronism; and means responsive to said pulse-group signal for applying automatic-gain-control to said receiver.

6. A keyed automatic-gain-control apparatus for a television receiver including a synchronizing-pulse supply circuit and a keying-pulse supply circuit, comprising: means including a mixing circuit coupled to both of said supply circuits for mixing synchronizing pulses and keying pulses and including load impedance means proportioned for developing a recurrent pulse-group signal having a frequency which is a beat between the frequencies of the synchronizing and keying pulses when they are out of synchronism; a stabilizing device coupled to said load circuit and responsive to the beat-frequency signal therein for stabilizing the same at one peak value thereof; and means responsive to said stabilized beat-frequency signal for applying automatic-gain-control to said receiver.

7. A keyed automatic-gain-control apparatus for a television receiver including a synchronizing-pulse supply circuit and a keying-pulse supply circuit, comprising: means including a mixing circuit coupled to both said supply circuits for mixing synchronizing pulses and keying pulses and including load impedance means proportioned for developing a recurrent pulse group signal having a frequency which is a beat between the frequencies of the synchronizing and keying pulses when they are out of synchronism, said load impedance means having a substantial impedance at the beat frequency and a negligible impedance at the frequency of the keying and synchronizing pulses; and means responsive to said pulse-group signal for applying automatic-gain-control to said receiver.

8. A keyed automatic-gain-control apparatus for a television receiver including a synchronizing-pulse supply circuit and a keying-pulse supply circuit, comprising: means including a mixing circuit coupled to both said supply circuits for mixing synchronizing pulses and keying pulses and including a load capacitance of the order of 0.004 microfarad for developing a recurrent pulse-group signal having a frequency which is a beat between the frequencies of the synchronizing and keying pulses when they are out of synchronism, said load capacitance having a substantial impedance at the beat frequency and a negligible impedance at the frequency of the keying and synchronizing pulses; and means responsive to said pulse-group signal for applying automatic-gain-control to said receiver.

9. An automatic-gain-control apparatus for a television receiver comprising: an electron-discharge device effectively having an anode, a cathode, and a control electrode; means including biasing means for normally maintaining said device nonconductive; a circuit coupled to said control electrode and cathode for applying thereto a composite modulation signal including the original unidirectional components and including synchronizing pulses having such polarity as to tend to develop anode current in said device; a circuit including a conductive circuit element coupled between said anode and cathode for applying thereto across said conductive circuit element periodic control pulses having an amplitude substantially unaffected by amplitude variations of said synchronizing pulses and a frequency component not greatly different from a frequency component of said synchronizing pulses and with such polarity as to render said device conductive and develop anode-current pulses only during coincidence of said synchronizing pulses and said control pulses, said anode-current pulses sometimes occurring during pull-in operation of the receiver in beat-frequency groups having a recurrence rate substantially less than that of said synchronizing pulses due to intermittent coincidence of said synchronizing pulses and said control pulses; a direct-current path between said anode and cathode with a point of fixed potential therein and including a resistor which is connected to said anode through said conductive circuit element and connected to said fixed potential point and carries the unidirectional and beat-frequency components of said anode current and has developed thereacross corresponding components of voltage; a condenser which is connected between said fixed potential point and the junction of said conductive circuit element and said resistor and has developed thereacross each of said components of voltage, said resistor and condenser having a time constant which is long with respect to said synchronizing pulses but not long with respect to said beat-frequency components of voltage; a clamping device effectively connected in parallel with said condenser and responsive to the positive peak amplitudes of said beat-frequency voltage for clamping said peak amplitudes at said fixed potential and developing across said condenser an additional component of unidirectional voltage; a pair of output terminals; and a filter network coupled between said condenser and said terminals and having a time constant not less than the period of said beat-frequency voltage for developing between said terminals from said unidirectional voltages across said condenser a substantially ripple-free gain-control voltage.

10. An automatic-gain-control apparatus for a television receiver comprising: an electron-discharge device effectively having an anode, a cathode, and a control electrode; means including biasing means for normally maintaining said device nonconductive; a circuit coupled to said control electrode and cathode for applying thereto a composite modulation signal including the original unidirectional components and including synchronizing pulses having such polarity as to tend to develop anode current in said device; a circuit including a transformer winding coupled between said anode and cathode for applying thereto periodic control pulses having an amplitude substantially unaffected by amplitude variations of said synchronizing pulses and a frequency component not greatly different from a frequency component of said synchronizing pulses and with such polarity as to render said device conductive and develop anode-current pulses only during coincidence of said synchronizing pulses and said control pulses, said anode-current pulses sometimes occurring during pull-in operation of the receiver in beat-frequency groups having a recurrence rate substantially less than that of said synchronizing pulses due to intermittent coincidence of said synchronizing pulses and said control pulses; a direct-current path between said anode and cathode with a point of fixed potential therein and including a resistor which is connected to said anode through said winding and connected to said fixed-potential point and carries the unidirectional and beat-frequency components of said anode current and has developed thereacross corresponding components of voltage; a condenser which is connected between said fixed-potential point and the junction of said winding and said resistor and has developed thereacross each of said components of voltage, said resistor and condenser having a time constant which is long with respect to said synchronizing pulses but not long with respect to said beat-frequency components of voltage; a clamping device effectively connected in parallel with said condenser and responsive to the positive peak amplitudes of said beat-frequency voltage for clamping said peak amplitudes at said fixed potential and developing across said condenser an additional component of unidirectional voltage; a pair of output terminals; and a filter network coupled between said condenser and said terminals and having a time constant not less than the period of said beat-frequency voltage for developing between said terminals from said unidirectional voltages across said condenser a substantially ripple-free gain-control voltage.

References Cited in the file of this patent

UNITED STATES PATENTS 2,615,089 Rogers ---------------- Oct. 21, 1952